United States Patent
Isenberg (10) Patent No.: US 7,624,396 B1
(45) Date of Patent: Nov. 24, 2009

(54) RETRIEVING EVENTS FROM A QUEUE

(75) Inventor: Miguel Isenberg, Paderborn (DE)

(73) Assignee: Sun Microsystems, Inc., Santa Clara, CA (US)

( * ) Notice: Subject to any disclaimer, the term of this patent is extended or adjusted under 35 U.S.C. 154(b) by 941 days.

(21) Appl. No.: 10/789,523

(22) Filed: Feb. 26, 2004

(51) Int. Cl.
G06F 3/00 (2006.01)
G06F 9/44 (2006.01)
G06F 9/46 (2006.01)
G06F 13/00 (2006.01)

(52) U.S. Cl. ...................................... 719/314

(58) Field of Classification Search ............. 712/28–43, 712/200–207, 216–248; 718/100–103, 106–108; 719/310–320, 328–332
See application file for complete search history.

(56) References Cited

U.S. PATENT DOCUMENTS

| 5,727,214 A | * | 3/1998 | Allen .......................... 719/318 |
| 5,937,205 A | * | 8/1999 | Mattson et al. ................. 710/6 |
| 6,223,207 B1 | * | 4/2001 | Lucovsky et al. ........... 718/107 |
| 6,631,363 B1 | * | 10/2003 | Brown et al. .................... 707/1 |
| 6,658,485 B1 | * | 12/2003 | Baber et al. ................. 719/314 |
| 6,687,729 B1 | * | 2/2004 | Sievert et al. ................ 718/102 |
| 6,745,262 B1 | * | 6/2004 | Benhase et al. ............... 710/40 |
| 6,901,596 B1 | * | 5/2005 | Galloway ................... 719/330 |
| 7,051,330 B1 | * | 5/2006 | Kaler et al. ................. 718/106 |
| 7,061,858 B1 | * | 6/2006 | Di Benedetto et al. ...... 370/219 |
| 2002/0082856 A1 | * | 6/2002 | Gray et al. ....................... 705/1 |
| 2002/0194441 A1 | * | 12/2002 | Chauvel et al. ............. 711/158 |
| 2003/0055768 A1 | * | 3/2003 | Anaya et al. .................. 705/36 |
| 2004/0059879 A1 | * | 3/2004 | Rogers ....................... 711/154 |
| 2004/0109410 A1 | * | 6/2004 | Chase et al. ................ 370/229 |
| 2005/0004970 A1 | * | 1/2005 | Jain et al. ................... 709/200 |
| 2007/0168991 A1 | * | 7/2007 | Greenberg et al. .......... 717/127 |

OTHER PUBLICATIONS

Bhattacharya, Design Notes on Asynchronous I/O (aio) for Linux, IBM Software Labs, India, Jan. 30, 2002, pp. 1-22.*

* cited by examiner

*Primary Examiner*—Li B Zhen
*Assistant Examiner*—Diem K Cao
(74) *Attorney, Agent, or Firm*—Osha • Liang LLP (57) ABSTRACT

Methods and apparatus, including computer program products, implementing and using techniques for retrieving events from an event port. A request to retrieve a specified number of events from an event port to which completed events are posted by one or more event sources is received from a computer software application. It is determined whether the specified number of events is available at the event port. If the specified number of events is available at the event port, the specified number of events is retrieved from the event port and the retrieved events are returned to the requesting computer software application. If fewer events than the specified number of events are available at the event port, the request is placed in a request queue with requests to be processed at a later time and the request queue is ordered based on priorities of the requests in the request queue.

41 Claims, 4 Drawing Sheets

RETRIEVING EVENTS FROM A QUEUE

BACKGROUND

Input and output (I/O) is an essential element of computer operating systems and refers to operations that occur between a computer and external devices, such as printers, storage devices, and other computers. I/O also refers to internal computer operations, such as communication between a processor in the computer and internal disks, memory, and so on.

There are two main categories of I/O: synchronous and asynchronous. In synchronous I/O, when an application calls an I/O operation, the application is suspended until the I/O operation is complete, which is typically signaled by an "interrupt" signal transmitted to the application that requested the I/O operation. In asynchronous I/O, on the other hand, when an application calls an I/O operation, the application is free to perform other tasks while the I/O is being completed. Asynchronous I/O is thus very useful in that it, for example, allows an application to read data being input from a keyboard, while writing data onto a computer screen, and maybe also reading data from a disk drive or memory.

Transactions typically refer to asynchronous read or write operations, as well as interactions between an application and a kernel that requires an asynchronous completion notification. The asynchronous completion notifications can generally be referred to as events.

In a computer operating system, whenever an event occurs, the event is placed in an event queue. Event queues can typically accommodate events generated from several disjoint sources, such as asynchronous I/O, timers, user-defined events, file descriptor events, and so on. Applications can access the event queues through event ports to retrieve events that are in the event queues. The event ports may be physical addresses on a computer or computer device, or mapped locations in the computer's memory. Event ports (and the corresponding event queues) are generally only created on demand.

Typically there is one event queue for every application thread. A thread generally refers to a part of an application program that can run independently and along with other threads to accomplish a task. A number of computer operating systems support multiple threads. Each thread shares the same address space, descriptors, and other resources within an application process, but has its own program counter for execution. A multi-threaded application process can be used for I/O operations that happen on the same descriptor or on different descriptors. Due to the high speed of processors, in a multi-threaded environment, several I/O operations often appear to occur simultaneously.

In many implementations related to retrieving events from an event queue, the application cannot specify the number of events desired to be collected from a particular event port. For example, a standard function poll(2) identifies file descriptors on which an application can read or write data, or on which certain events have occurred, but always returns when at least one event is triggered. Also, typically event queues cannot be shared across processes, which can lead to the existence of many queues with a significant amount of associated overhead processing costs.

SUMMARY

The present invention provides methods and apparatus for retrieving events from an event port in a computer system.

In general, in one aspect, the invention provides methods and apparatus, including computer program products, implementing and using techniques for retrieving events from an event port. A request to retrieve a specified number of events from an event port to which completed events are posted by one or more event sources is received from a computer software application. It is determined whether the specified number of events is available at the event port. If the specified number of events is available at the event port, the specified number of events is retrieved from the event port and the retrieved events are returned to the requesting computer software application. If fewer events than the specified number of events are available at the event port, the request is placed in a request queue with requests to be processed at a later time and the request queue is ordered based on priorities of the requests in the request queue.

Implementations can include one or more of the following features. Ordering can include placing requests with a higher priority ahead of requests with lower priority in the request queue. Ordering can include placing two or more requests with a same priority in a stack and placing the stack in the request queue based on the priority of the requests in the stack. The specified number of events to be retrieved from the event port can indicate a priority of the request. A priority of a request can be inversely proportional to the specified number of events.

The request queue can contain requests generated by one or more computer software application threads. The request queue can contain requests generated by one or more computer software application processes. The number of events to be retrieved from the event port can be specified by the computer software application. The number of events to be retrieved from the event port can be specified by the computer software application based on user input. If fewer events than the specified number of events are available at the event port, it can be determined whether there are any requests in the request queue that can be satisfied by the available number of events at the event port, and if there are requests in the request queue that can be satisfied, the specified number of events can be retrieved from the event port for one or more such requests, and the retrieved events can be returned to the requesting computer software application.

The request can have an associated timeout prior to which the request must be satisfied. If a timeout occurs for a request while the request is in the request queue, all the available events at the event port at the time of timeout can be retrieved and the request can be returned to the computer software application with the retrieved events. An empty request can be returned to the requesting software application if the request cannot be satisfied. The empty request can be returned together with an error code indicating the cause for why the request cannot be satisfied. An empty request can be returned to the requesting software application if one or more of the following error conditions occur: the request contains an invalid event port identifier, an event or a list of events list cannot be delivered, a timeout argument is out of range, and a timeout interval expires before an expected number of events has been posted to the event port.

Returning the retrieved events to the requesting computer software application can include returning one or more of: one or more detected events, one or more event source identifiers where the detected events were generated, one or more objects specific to an event source, and one or more user defined values. If the specified number of events is zero, the number of available events at the event port can be identified and the requesting computer software application can be informed of how many events are available at the event port. If an alert event is posted to the event port, all requests in the request queue can be returned to their respective computer software applications with the posted alert event. The events can be asynchronous events. The events can be transaction events. The event sources can include one or more of: input devices, output devices, timers, signals, file updates, applications, system libraries, and drivers.

In general, in another aspect, the invention provides a queue management apparatus for retrieving transaction events generated by one or more event sources in a computer system. The queue management apparatus includes an event queue, a request queue, and a queue manager. The event queue receives transaction events generated by one or more event sources and is accessible through an event port. The request queue holds requests to retrieve transaction events from the event queue. Each request has an associated priority that determines a place of the request in the request queue. The queue manager receives requests from a computer software application and organizes the received requests in the request queue, determines whether a sufficient number of events are available in the event queue to fill a request with a highest priority in the request queue, and if a sufficient number of events is available in the event queue, the queue manager retrieves the events needed to fill the request with the highest priority in the request queue through the event port and returns the filled request to the requesting computer software application.

Implementations can include one or more of the following features. The request queue can include one or more stacks, where each stack contains two or more requests with a same priority, and the stacks are ordered in the request queue based on the priority of the requests in the respective stacks. The priority of a request can be indicated by a number of events to be retrieved by the request. A request in the request queue can have an associated timeout prior to which the request must be satisfied.

The invention can be implemented to include one or more of the following advantages. The number of events to be retrieved from an event queue can be specified. Event queues can be shared across application processes. An application can change a priority of a thread, for example, depending on a system load. That is, the application can be informed about the number of available events in the event queue. Depending on the number of available events, the priority can be changed, such as waiting for a longer time when there are many events (since it is not very efficient to perform one system call per event). Instead, for example, the application can wait for 10 or 100 events, which reduces the number of system calls for performing the same work. On the other hand, when a system is not busy, it is possible to react immediately to events by requesting the I/O to return every single event to the application as soon as an event becomes available.

The details of one or more embodiments of the invention are set forth in the accompanying drawings and the description below. Other features of the invention will be apparent from the description and drawings, and from the claims.

DESCRIPTION OF DRAWINGS

Like reference symbols in the various drawings indicate like elements.

DETAILED DESCRIPTION

The invention will be described in detail below by way of example with respect to asynchronous I/O completion notifications. It should however be noted that the principles described below are applicable to any type of event that can be sent to an event queue and retrieved from the event queue using an event port.

Figure 1:
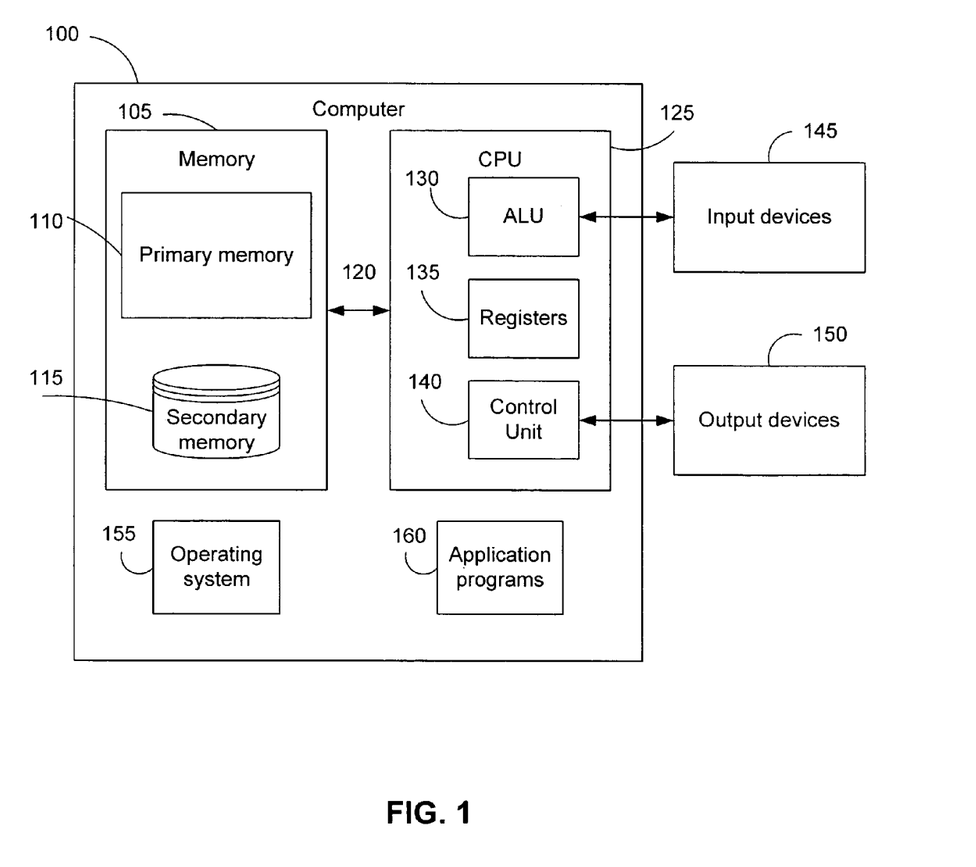
FIG. 1 shows a schematic block diagram of a computer connected to input and output devices, respectively.

FIG. 1 shows a schematic block diagram of a computer (100) that is connected to one or more input devices (145), such as a keyboard, a computer mouse, or a scanner. The computer (100) is also connected to one or more output devices (150), such as a display, and/or a printer. It should be noted that some devices, such as modems, can be used both as input and output devices. The computer (100) includes a memory (105), which has a primary memory component (110), such as a semiconductor RAM for short-term storage, and a secondary memory component (115), such as a ROM, magnetic or optical discs, flash memory, or tape, which is primarily used for long-term storage. As will be appreciated by those skilled in the art, the memory (105) can include a variety of other memory components. The computer (100) further includes a Central Processing Unit (CPU) (125), which has an Arithmetic logical unit (ALU) (130) for performing computations, registers (135) for temporary storage of data, and a control unit (140) for controlling operation of the computer (100). A variety of CPUs are available from different vendors. It should be noted that one or more components of the computer 100 can be located remotely and accessed through a network.

The computer (100) further includes an operating system (155) and one or more application programs (160). As will be appreciated by those skilled in the art, the operating system (155) can be described as software that controls the computer's (100) resource allocation, whereas the application programs (160) are software that performs tasks that are typically requested by a user, by using available operating system resources.

Event sources, such as the input and/or output devices that are connected to the computer, either directly or through a network, generate events that are posted to an event port. Examples of event sources are input devices, output devices, timers, signals, file updates, applications, system libraries, and drivers. Examples of events are various asynchronous events or transaction events. Computer software applications can send out requests to retrieve a specified number of events from the event port. Whenever such a request is received at the event port, the computer system determines whether the specified number of events is available at the event port, and based upon this determination, takes some type of action. If the specified number of events is available at the event port, the specified number of events is retrieved from the event port and returned to the requesting computer software application. If fewer than the specified number of events is available at the event port, the request is placed in a request queue with requests to be processed at a later time. The request queue can be ordered based on priorities of the requests in the request queue.

The ordering of the request queue can be based on priorities of the requests, such that requests with a higher priority are placed ahead of requests with lower priority in the request queue. If two or more requests have the same priority, they can be placed in a stack, and the stack can be arranged within the request queue based on the priority of the requests in the stack. The priority of a request can be indicated by the specified number of events to be retrieved from the event port, for example, the priority of a request can be inversely proportional to the specified number of events.

The requests can be generated by one or more computer software application threads or computer software application processes, and the number of events to be retrieved from the event port can be specified by the computer software application, either automatically or based on user input. In a situation where fewer than the specified number of events is available at the event port, the computer system can determine whether there are any requests in the request queue that can be satisfied by the available number of events at the event port and if there are requests in the request queue that can be satisfied, the specified number of events can be retrieved from the event port for one or more such requests and returned to the requesting computer software application.

It is also possible to associate a timeout with a request. If the request is not satisfied before the timeout occurs, all the available events at the event port at the time of timeout are retrieved, and the request is returned to the computer software application with the retrieved events. If a request cannot be satisfied, the request can be returned empty to the requesting software application, possibly with an error code that indicates the cause of why the request cannot be satisfied. Empty requests may result from a number of error conditions, such as the request contains an invalid event port identifier, an event or a list of events list cannot be delivered, a timeout argument is out of range, and a timeout interval expires before an expected number of events has been posted to the event port.

The contents of the returned requests can be, for example, one or more detected events, one or more event source identifiers that identify one or more event sources where the detected events were generated, one or more objects specific to an event source, and one or more user defined values. If the specified number of events is zero, the number of available events at the event port is identified and the requesting computer software application is informed of how many events are available at the event port.

The invention can also be described in terms of a queue management apparatus for retrieving transaction events generated by one or more event sources in a computer system. The queue management apparatus includes an event queue, a request queue, and a queue manager. The event queue receives transaction events generated by one or more event sources and is accessible through an event port. The request queue holds requests to retrieve transaction events from the event queue. Each request has an associated priority determining a place of the request in the request queue. The queue manager receive requests from a computer software application, organizes the received requests in the request queue, and determines whether a sufficient number of events is available in the event queue to fill a request with a highest priority in the request queue. If a sufficient number of events is available in the event queue, the queue manager retrieves the events needed to fill the request with the highest priority in the request queue through the event port and return the filled request to the requesting computer software application.

Figure 2:
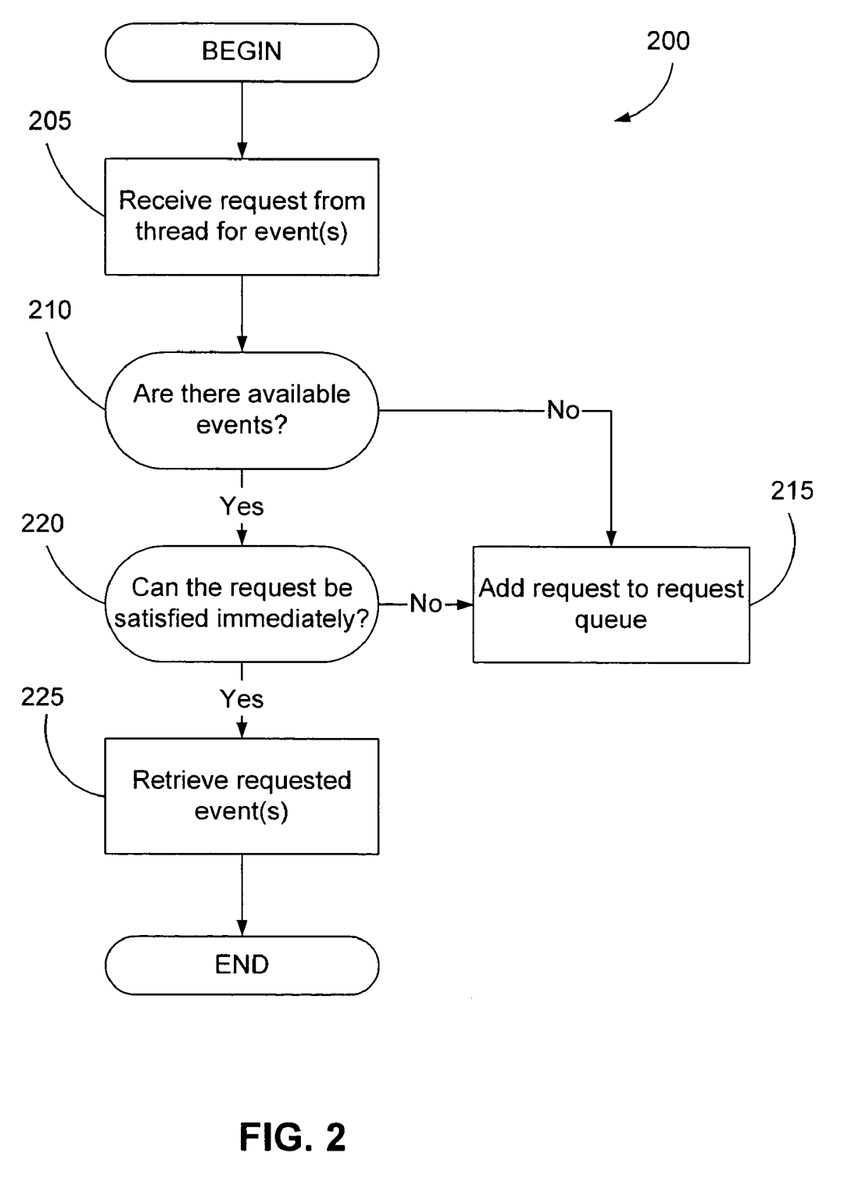
FIG. 2 shows a schematic flowchart of how an incoming request from a program application is processed.

FIG. 2 shows a process (200) for how an incoming request from a program application is processed. In FIG. 2, it is assumed that an event port is used to access an event queue, which is implemented as an internal FIFO (First In First Out) queue on the computer (100). It is further assumed that the program application has specified what event sources are permitted to post events, e.g., disjoint events, to the event port.

The various event sources define the meaning of the events. For example, in the case of asynchronous I/O an event may mean that a transaction has been performed, in the case of a standard file descriptor an event may mean that data is available (POLLIN) or that a socket has been closed (POLLHUP), in the case of a timer an event may mean that a timer signal was generated, in the case of a signal an event may mean that a specific signal was sent to a process, and so on.

In order to retrieve events from the event port, application threads send out requests to the event port. In this example, an application thread is a unit of execution and a request is a request object that is sent to the event port. The requests are ordered internally in a request queue when an application thread needs to wait or block. As will be explained in further detail below, each request has a priority, which can be used to determine the processing order (i.e., a priority order) of the requests in the request queue. As will be appreciated by those skilled in the art, the process illustrated in FIG. 2 is equally well applicable to configurations with multiple event ports, which will typically be the case. The single event port/event queue model is only used herein for facilitating the explanation of the process.

As can be seen in FIG. 2, the process begins by receiving a request from a thread to retrieve one or more events (step 205). In one implementation, the request is made by a function port_get( ), which can retrieve a single event, or by a function port_getn( ), which can retrieve multiple events from an event port. Both of these functions will be described in further detail below. The process then checks whether there are any available events to retrieve (step 210) in the event queue. If there are no available events to retrieve, and it is desired that the request should wait until events become available, the process adds the request to a request queue (step 215), which will be explained in more detail below with reference to FIG. 3. The request queue is ordered in such a manner that the requests in the request queue can be retrieved at a later time as events become available in the event queue.

If the process detects in step 210 that there are available events, the process continues to examine whether the request can be satisfied immediately (step 220), that is, whether there is a sufficient number of available events at the event port to satisfy the request. If the request can be satisfied immediately, the process retrieves the requested events (step 225), and the fulfilled request returns to the application program that originally submitted the request. If the request cannot be satisfied immediately, the process adds the request to the request queue (step 215). As will be discussed in further detail below with reference to Table 2, the port_getn( ) function is called with two arguments, a desired number of events to be retrieved, and a maximum number of events. The requested number of events that is returned in step 225 above is the desired number of events in the port_getn( ) function. The maximum number of events, on the other hand, describes the limits of the memory space to which the retrieved events are sent, i.e., the largest number of events the requesting application can accommodate.

Figure 3:
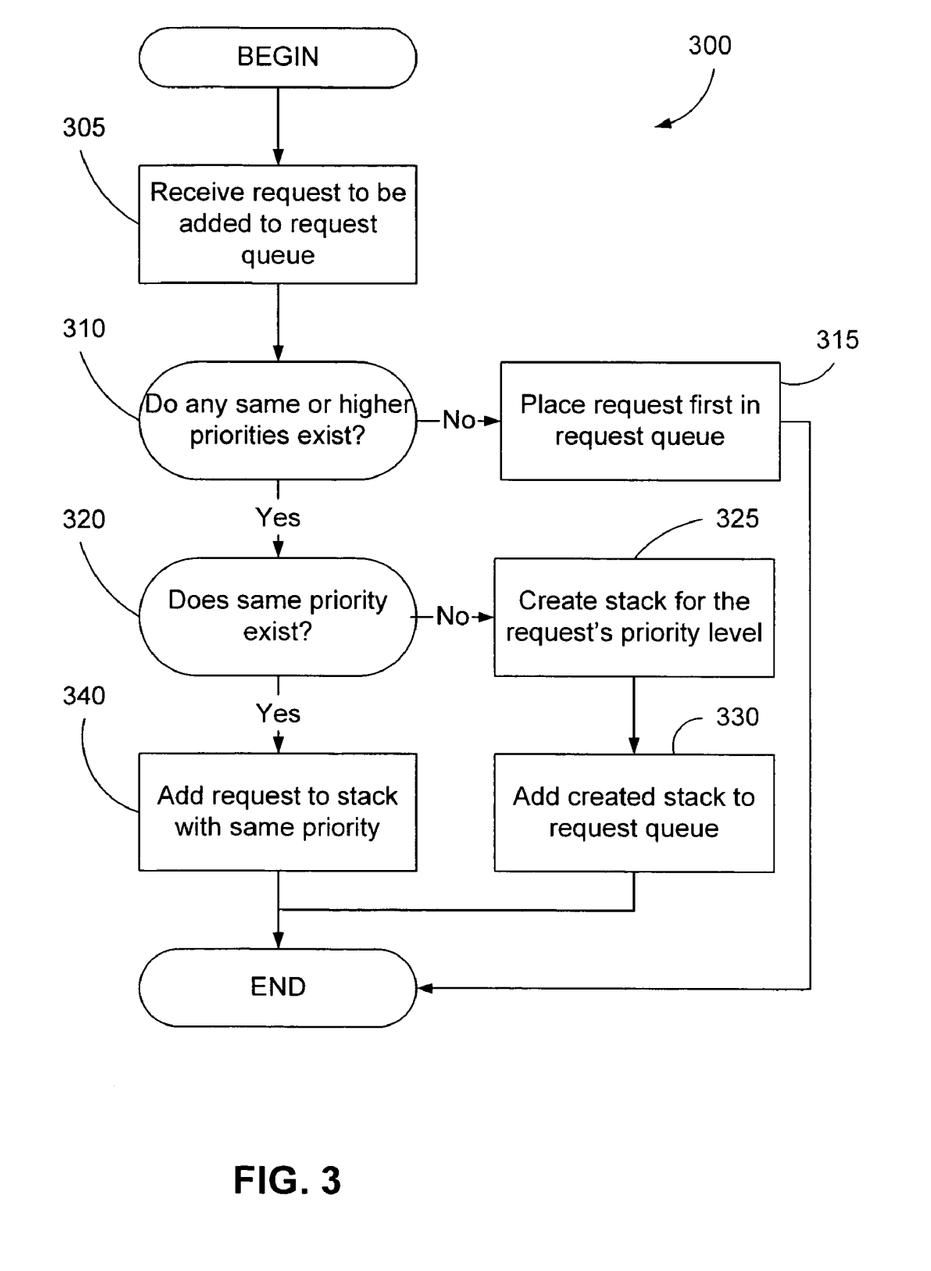
FIG. 3 shows a schematic flowchart of how requests are organized in the request queue (step 215 of FIG. 2).

FIG. 3 shows a more detailed view of step 215 of FIG. 2, that is, a process (300) for adding requests to the request queue. In one implementation, the global organization of the request queue is based on a priority level for each request. A higher priority means a request for fewer events, such that the request can be satisfied faster. If there are multiple requests with the same priority, these same priority requests are organized internally as a stack, that is, a LIFO (Last In First Out) queue.

As can be seen in FIG. 3, a request to be added to the request queue is received (step 305). In order to find the proper position for the request in the request queue, the process checks whether there are already any waiting requests in the request queue that have a same or higher priority (step 310). If there are no requests in the request queue with same or higher priorities, i.e., if there are only requests waiting for more events than the received request, the request is placed first in the request queue (step 315) and the process ends.

However, if same or higher priority requests exist in the request queue, the process examines whether there are any requests in the request queue with the same priority (step 320). If there are no requests with the same priority in the request queue, the process creates a new stack for the priority level of the request (step 325) and adds the request to the stack. The newly created stack is then added to the request queue (step 330), and the process ends. If, on the other hand, the process determines in step 320 that there is already one or more requests in the request queue with the same priority, then the request is added to the stack of requests with the same priority (step 340), and the process ends.

As can be seen, this process guarantees that the request queue is ordered such that the highest priority requests are always placed in the front of the request queue, regardless of which application thread(s) issued the requests. Furthermore, all the waiting requests share the same request queue, regardless of which application thread they belong to.

In one implementation, the application threads also have the option to set a timeout for a request. If the timeout for a particular request expires while the request is waiting in the request queue, then the thread returns with a timeout notification to the application that originated the request, and with as many events as possible from the event port. In one implementation, if the requested number of events equals zero, then the port_getn( ) function does not retrieve any events, but instead informs the querying application about the number of available events in the event queue.

Figure 4:
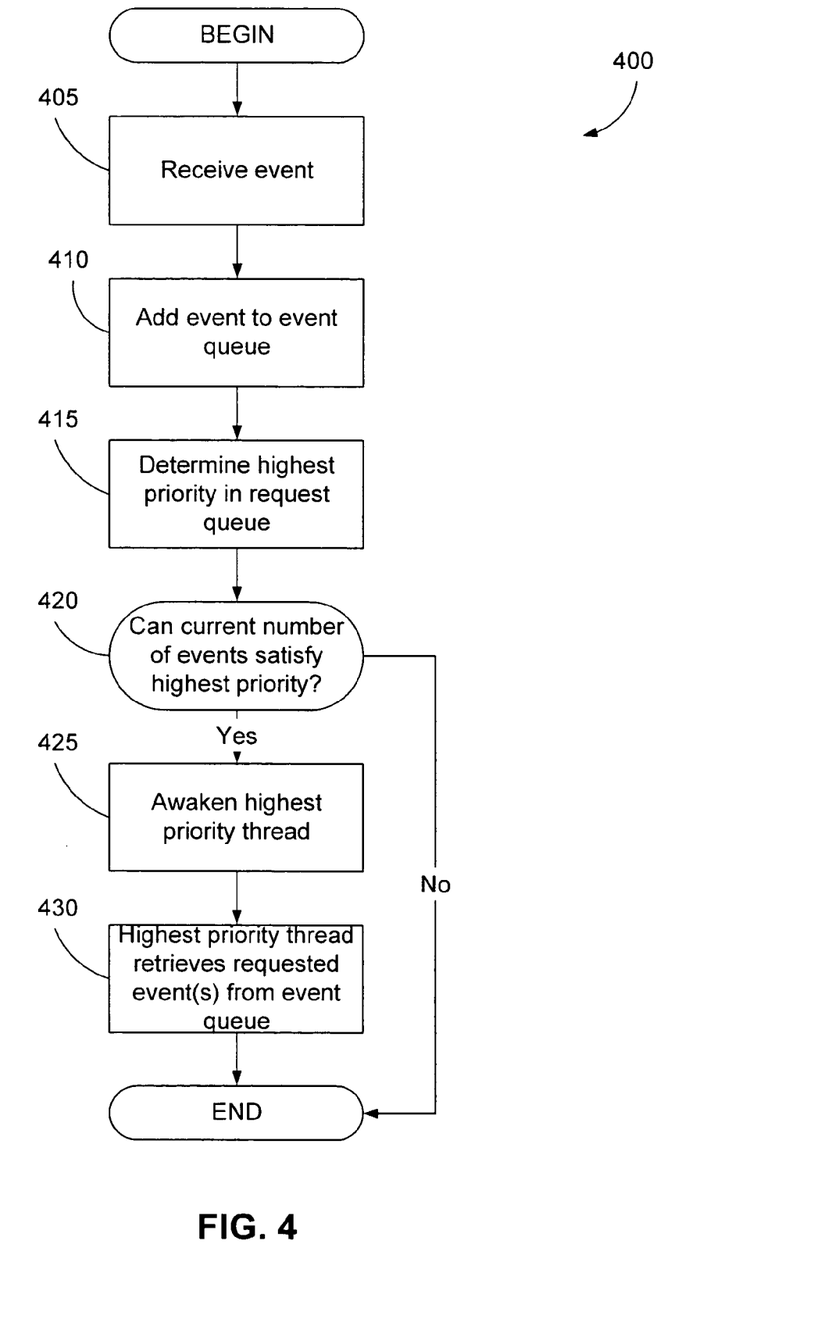
FIG. 4 shows a schematic flowchart of how an incoming event is processed when there are program application requests waiting for one or more events.

FIG. 4 shows a process (400) for how a processed event is handled when there are program application requests in the request queue waiting for one or more processed events. As can be seen in FIG. 4, a processed event is received (step 405). This processed event can, for example, be the completion of a disk I/O transaction (read or write transaction), a timer signal, data that becomes available for reading from a socket, another thread or process that sends a user-defined event to the event queue, and so on. When the processed event is received, the process adds the received event to the event queue, which is a FIFO queue (step 410). The process then determines the highest priority of the waiting requests in the request queue (step 415). This step is relevant and is preferably executed as fast as possible. The organization of the request queue that was described above facilitates this step, in that the process only needs to check the first request in the request queue, since the highest priority requests are always placed at the beginning of the request queue.

When the process has determined which request has the highest priority, the process checks whether the requested number of events in the highest priority request can be satisfied by the number of available events in the event queue (step 420). If the highest priority request cannot be satisfied, then the process leaves the event in the event queue and ends without further actions, and the process is repeated from the beginning when a subsequent event is received.

If the process determines in step 420 that the highest priority request can be satisfied, then the highest priority thread is "awakened," i.e., marked as runable, from its waiting state in the request queue (step 425). In a situation where there are multiple requests with the same highest priority (i.e., when there is a stack of requests with the same priority), the highest priority request that is on top of the stack is awakened. The awakened highest priority thread then retrieves the requested event(s) from the event queue (step 430), and the process ends.

Retrieving the requested events from the event queue may take a long time, in particular if the number of events is large, such as several thousands of events. In one implementation, any incoming events during this retrieval time are put in the event queue without further actions until the thread has received all its events. When the thread returns with its retrieved events, the thread checks if another request of the same priority, or of a next lower priority, can be satisfied immediately. If the next request can be satisfied immediately, the thread proceeds to awaken this next request before returning to its application.

As was described above, in one implementation, the events are retrieved from the event port(s) by one of two functions port_get( ) and port_getn( ), respectively. These functions are called by the application threads. The port_get( ) function can retrieve a single event and the port_getn( ) function can retrieve multiple events. The port_get( ) function returns an integer and is called with the arguments shown in Table 1 below:

TABLE 1

| Argument | Type | Comments |
| --- | --- | --- |
| port | int | Event port address from which events are to be retrieved |
| *pe | port_event_t | Pointer to an uninitialized port_event_t structure that is filled in by the system when the port_get( ) function returns successfully. The port_event_t structure contains the following members: portev_events; /* detected events */ portev_source; /* event source */ portev_object; /* specific to event source */ *portev_user; /* user defined cookie */ The portev_events and portev_object arguments are specific to the event source. The portev_events denotes the delivered events. The portev_object refers to the associated object. The portev_source argument specifies the source of the event. The portev_user argument is a user-specified value. |
| *timeout | const timespec_t | Pointer to a timeout value that specifies how long a request should wait before timeout occurs. If the timeout pointer is NULL, the port_get( ) function blocks until an event is available. To poll for an event without waiting, timeout points to a zeroed timespec. A non-zeroed timespec specifies the desired time to wait for events. The port_get( ) function returns before the timeout elapses if an event is available, a signal occurs, an event port is closed by another thread, or the event port is in or enters alert mode. |

The port_getn( ) function returns an integer and is called with the arguments shown in Table 2 below:

TABLE 2

| Argument | Type | Comments |
| --- | --- | --- |
| port | int | Event port address from which events are to be retrieved |

TABLE 2-continued

| Argument | Type | Comments |
|---|---|---|
| list[ ] | port_event_t | Array of uninitialized port_event_t structures (see Table 1 above) that is filled in by the system when the port_getn( ) function returns successfully. |
| max | uint_t | The maximum number of events that can be returned in list[ ]. If max is ( ), the value pointed to by nget (see below) is set to the number of events available on the event port. The port_getn( ) function returns immediately but no events are retrieved. |
| *nget | uint_t | A pointer to the desired number of events to be retrieved. On return, the value pointed to by nget is updated to the actual number of events retrieved in list[ ]. Internally, the content of *nget can be used to prioritize the threads or processes that are waiting for events, as was discussed above. |
| *timeout | const timespec_t | Pointer to a timeout value that specifies how long a request should wait before timeout occurs. If the timeout pointer is NULL, the port_get( ) function blocks until an event is available. To poll for an event without waiting, timeout points to a zeroed timespec. A non-zeroed timespec specifies the desired time to wait for events. The port_get( ) function returns before the timeout elapses if an event is available, a signal occurs, an event port is closed by another thread, or the event port is in or enters alert mode. |

The port_getn( ) function waits until the desired number of events is available, the timeout elapses, a signal occurs, an event port is closed by another thread, or the event port is in or enters alert mode. The alert mode is indicated by the existence of an alert event in the event queue, and causes all requests waiting in the request queue to return immediately to their respective applications (regardless of the number of events requested or any associated timeouts) with the alert event.

The port_getn( ) and the port_getn( ) functions ignore non-shareable events generated by other processes. Upon successful completion, the value 0 is returned. Otherwise, the value −1 is returned and the error identifier "errno" is set to indicate the type of error. A list of the different types of errors that may occur in one implementation of the invention is presented below in Table 3. As the reader skilled in the art will realize, other types of errors may occur, depending on the system environment in which the functions are implemented.

TABLE 3

| Error identifier | Applicable function | Comments |
|---|---|---|
| EBADF | port_get( ) and port_getn( ) | The port identifier is not valid. |
| EBADFD | port_get( ) and port_getn( ) | The event port argument is not an event port file descriptor. |
| EFAULT | port_get( ) and port_getn( ) | Event or event list cannot be delivered (list[ ] pointer and/or user space reserved to accommodate the list of events is not reasonable), or the timeout argument is not reasonable. |
| EINTR | port_get( ) and port_getn( ) | A signal was caught during the execution of the function. |
| EINVAL | port_get( ) and port_getn( ) | The timeout element tv_sec or tv_nsec is < 0 or > 1000000000. |
| ETIME | port_get( ) and port_getn( ) | The time interval expired before the expected number of events has been posted to the event port. |

TABLE 3-continued

| Error identifier | Applicable function | Comments |
|---|---|---|
| EINVAL | port_getn( ) | The list[ ] argument is NULL, the nget argument is NULL, or the content of nget is > max and max is > 0. |
| EFAULT | port_getn( ) | The timeout argument is not reasonable. |
| ETIME | port_getn( ) | The time interval expired before the expected number of events has been posted to the event port (original value in nget), or nget is updated with the number of returned port_event_t structures in list[ ]. |

EXAMPLE port_get( )

Table 4 below shows an example of an event port being created, a user event (PORT_SOURCE_USER) being sent to the event port and being retrieved with port_get( ), followed by the event port being closed. The portev_user and portev_events members of the port_event_t structure are the same as the corresponding user and events arguments of the standard port_send(3C) function.

TABLE 4

```
#include port.h>
    int         myport;
    port_event_t      pe;
    struct timespec timeout;
    int         ret;
    void            *user;
    uintptr_t       object;
    myport = port_create( );
    if (myport < 0) {
        /* port creation failed . . . */
        ...
        return( . . . );
    }
    ...
    events = 0x01;           /* own event definition(s) */
    object = <myobject>;
    user = <my_own_value>;
    ret = port_send(myport, events, object, user);
    if (ret == −1) {
        /* error detected . . . */
        ...
        close(myport);
        return ( . . . );
    }
/*
 * The following code could also be executed in another thread or
 * process.
 */
    timeout.tv_sec = 1; /* user defined */
    timeout.tv_nsec = 0;
    ret = port_get(myport, &pe, &timeout);
    if (ret == 1) {
        /*
         * error detected:
         * - EINTR or ETIME: log error code and try again . . .
         * - Other kind of errors: may have to close the port . . .
         */
        return( . . . );
    }
/*
 * After port_get( ) returns successfully, the port event_t structure
 will be filled with:
 * pe.portev_source = PORT_SOURCE_USER
 * pe.portev_events = 0x01
```

TABLE 4-continued

```
 * pe.portev_object = <myobject>
 * pe.portev_user = <my_own_value>
 */
...
    close(myport);
```

EXAMPLE port_getn( )

Table 5 below shows an example of an event port being created, ten user events being sent to the event port and being retrieved with port_getn( ), followed by the event port closing. A loop counter is used as events for the user-defined events. The user pointer is the same for all generated events. The timeout feature is also illustrated in the example below. As can be seen in Table 5, if a timeout occurs, the function checks to see if any events could be retrieved from the event port and, if no events could be retrieved, closes the event port and returns an error.

TABLE 5

```
#include <port.h>
/*
 * port_getn( )
 * submit 10 user-defined events to a port. Use port_getn( ) to retrieve
 * that number of events. Use the loop counter as events for the
 used-defined
 * events. The user pointer is the same for all generated events.
 */
#define MAX_EVENTS 10
void
{
port_getn ( )
{
    port_event_t *pev;
    port_event_t evlist[MAX_EVENTS];
    struct    timespec timeout;
    int       error;
    int       port;
    int       events;
    int       *user;
    uint_t    nget;
    uint_t    max;
    uint_t    index;
    user = (void *)0xbadface;
    port = port_create( );
    if(port == -1) {
        error = errno;
        printf("Can not create a port: errno = %d\n", error);
        return;
    }
    /* send user-defined events to the port */
    for (nget = 0; nget < MAX_EVENTS; nget++) {
        events = nget; /* example */
        error = port_send(port, events, user);
        if (error) {
            printf("port_send( ) returns error\n");
            (void) close (port);
            return;
        }
    }
    /* Use port_getn( ) to retrieve events */
    timeout.tv_sec = 0;
    timeout.tv_nsec = 10;
    nget = MAX_EVENTS;
    max = MAX_EVENTS; /* example */
    error = port_getn(port, evlist, max, &nget, &timeout);
```

TABLE 5-continued

```
    if (error == -1) {
        if (errno != ETIME)) {
            perror("port_getn( ) failed:");
            (void) close (port);
            return;
        } else {
            /*
             * timeout happens ... check if some valid events
             * could be retrieved.
             */
            if(nget == 0) {
                /* no events retrieved */
                perror("port_getn( ) failed:");
                (void) close (port);
                return;
            }
            /* some events retrieved ... ignore timeout, continue */
        }
    }
    if (nget != MAX_EVENTS) {
        printf("port_getn( ) returns less events ... (%d)\n",nget);
        (void) close (port);
        return;
    }
    /*
     * A loop here could check the event type to distribute the events
     * to other threads/functions ...
     */
    ...
    /* check events field */
    for (index = 0; index < nget; index++) {
        pev = &evlist[index];
        if ((pev-> portev_events != index) ||
            (pev-> portev_user != user)) {
            printf("Wrong event data detected\n");
            (void) close (port);
            return;
        }
    }
    /* everything is ok */
    (void) close(port);
}
```

The invention can be implemented in digital electronic circuitry, or in computer hardware, firmware, software, or in combinations of them. Apparatus of the invention can be implemented in a computer program product tangibly embodied in a machine-readable storage device for execution by a programmable processor; and method steps of the invention can be performed by a programmable processor executing a program of instructions to perform functions of the invention by operating on input data and generating output. The invention can be implemented in one or more computer programs that are executable on a programmable system including at least one programmable processor coupled to receive data and instructions from, and to transmit data and instructions to, a data storage system, at least one input device, and at least one output device. Each computer program can be implemented in a high-level procedural or object-oriented programming language, or in assembly or machine language if desired; and in any case, the language can be a compiled or interpreted language. Suitable processors include, by way of example, both general and special purpose microprocessors. Generally, a processor will receive instructions and data from a read-only memory and/or a random access memory. Generally, a computer will include one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM disks. Any of the foregoing can be supplemented by, or incorporated in, ASICs (application-specific integrated circuits).

To provide for interaction with a user, the invention can be implemented on a computer system having a display device such as a monitor or LCD screen for displaying information to the user and a keyboard and a pointing device such as a mouse or a trackball by which the user can provide input to the computer system. The computer system can be programmed to provide a graphical user interface through which computer programs interact with users.

A number of implementations of the invention have been described. Nevertheless, it will be understood that various modifications may be made without departing from the spirit and scope of the invention. Accordingly, other embodiments are within the scope of the following claims.

The invention claimed is:

1. In a computer system, a method for retrieving events from an event port, the method comprising:
   receiving from a computer software application, a request to retrieve a specified number of events from an event port to which completed events are posted by one or more event sources;
   determining whether the specified number of events is available at the event port;
   if the specified number of events is available at the event port, retrieving the specified number of events from the event port and returning the retrieved events to the requesting computer software application;
   if fewer events than the specified number of events are available at the event port, placing the request in a request queue with requests to be processed at a later time and ordering the request queue based on priorities of the requests in the request queue, wherein the specified number of events to be retrieved from the event port is used to determine a relative priority of the request in the request queue with respect to other requests in the request queue; and
   changing the priorities of the requests in the request queue based on the number of events available at the event port, wherein the changing is further based on a specified number of events to be retrieved as part of at least one request received in response to at least one indication about the number of events available at the event port.

2. The method of claim 1, wherein ordering comprises:
   placing requests with a higher priority ahead of requests with lower priority in the request queue.

3. The method of claim 1, wherein ordering comprises:
   placing two or more requests with a same priority in a stack; and
   placing the stack in the request queue based on the priority of the requests in the stack.

4. The method of claim 1, wherein a priority of a request is inversely proportional to the specified number of events.

5. The method of claim 1, wherein the request queue comprises requests generated by one or more computer software application threads.

6. The method of claim 1, wherein the request queue comprises requests generated by one or more computer software application processes.

7. The method of claim 1, wherein the number of events to be retrieved from the event port is specified by the computer software application.

8. The method of claim 7, wherein the number of events to be retrieved from the event port is specified by the computer software application based on user input.

9. The method of claim 1, further comprising:
   if fewer events than the specified number of events are available at the event port, determining whether there are any requests in the request queue that can be satisfied by the available number of events at the event port; and
   if there are requests in the request queue that can be satisfied, retrieving the specified number of events from the event port for one or more such requests and returning the retrieved events to the requesting computer software application.

10. The method of claim 1, wherein the request has an associated timeout prior to which the request must be satisfied.

11. The method of claim 10, further comprising:
    if a timeout occurs for a request while the request is in the request queue, retrieving all the available events at the event port at the time of timeout; and
    returning the request to the computer software application with the retrieved events.

12. The method of claim 1, further comprising:
    returning an empty request to the requesting software application if the request cannot be satisfied.

13. The method of claim 12, wherein returning comprises:
    returning the empty request together with an error code indicating the cause for why the request cannot be satisfied.

14. The method of claim 1, further comprising:
    returning an empty request to the requesting software application if one or more of the following error conditions occur:
    the request comprises an invalid event port identifier, an event or a list of events list cannot be delivered, a timeout argument is out of range, and a timeout interval expires before an expected number of events has been posted to the event port.

15. The method of claim 1, wherein returning the retrieved events to the requesting computer software application comprises returning one or more of:
    one or more detected events, one or more event source identifiers where the detected events were generated, one or more objects specific to an event source, and one or more user defined values.

16. The method of claim 1, further comprising:
    if the specified number of events is zero, identifying the number of available events at the event port; and
    informing the requesting computer software application of how many events are available at the event port.

17. The method of claim 1, wherein the events are asynchronous events.

18. The method of claim 1, wherein the events are transaction events.

19. The method of claim 1, wherein the event sources include one or more of:
    input devices, output devices, timers, signals, file updates, applications, system libraries, and drivers.

20. A computer program product, stored on a machine-readable medium, comprising instructions operable to cause a computer to:
    receive from a computer software application, a request to retrieve a specified number of events from an event port to which completed events are posted by one or more event sources;
    determine whether the specified number of events is available at the event port;

if the specified number of events is available at the event port, retrieve the specified number of events from the event port and returning the retrieved events to the requesting computer software application;

if fewer events than the specified number of events are available at the event port, place the request in a request queue with requests to be processed at a later time and order the request queue based on priorities of the requests in the request queue, wherein the specified number of events to be retrieved from the event port is used to determine a relative priority of the request in the request queue with respect to other requests in the request queue; and changing the priorities of the requests in the request queue based on the number of events available at the event port, wherein the changing is further based on a specified number of events to be retrieved as part of at least one request received in response to informing the computer application software about the number of events available at the event port.

21. The computer program product of claim 20, wherein the instructions to order comprise instructions to:
place requests with a higher priority ahead of requests with lower priority in the request queue.

22. The computer program product of claim 20, wherein the instructions to order comprise instructions to:
place two or more requests with a same priority in a stack; and
place the stack in the request queue based on the priority of the requests in the stack.

23. The computer program product of claim 20, wherein a priority of a request is inversely proportional to the specified number of events.

24. The computer program product of claim 20, wherein the request queue comprises requests generated by one or more computer software application threads.

25. The computer program product of claim 20, wherein the request queue comprises requests generated by one or more computer software application processes.

26. The computer program product of claim 20, wherein the number of events to be retrieved from the event port is specified by the computer software application.

27. The computer program product of claim 26, wherein the number of events to be retrieved from the event port is specified by the computer software application based on user input.

28. The computer program product of claim 20, further comprising instructions to:
determine whether there are any requests in the request queue that can be satisfied by the available number of events at the event port, if fewer events than the specified number of events are available at the event port; and
retrieve the specified number of events from the event port for one or more such requests and returning the retrieved events to the requesting computer software application, if there are requests in the request queue that can be satisfied.

29. The computer program product of claim 20, wherein the request has an associated timeout prior to which the request must be satisfied.

30. The computer program product of claim 29, further comprising instructions to:
retrieve all the available events at the event port at the time of timeout if a timeout occurs for a request while the request is in the request queue; and
return the request to the computer software application with the retrieved events.

31. The computer program product of claim 20, further comprising instructions to:
return an empty request to the requesting software application if the request cannot be satisfied.

32. The computer program product of claim 31, wherein the instructions to return comprise instructions to:
return the empty request together with an error code indicating the cause for why the request cannot be satisfied.

33. The computer program product of claim 20, further comprising instructions to:
return an empty request to the requesting software application if one or more of the following error conditions occur:
the request contains an invalid event port identifier, an event or a list of events list cannot be delivered, a timeout argument is out of range, and a timeout interval expires before an expected number of events has been posted to the event port.

34. The computer program product of claim 20, wherein the instructions to return the retrieved events to the requesting computer software application comprise instructions to return one or more of:
one or more detected events, one or more event source identifiers where the detected events were generated, one or more objects specific to an event source, and one or more user defined values.

35. The computer program product of claim 20, further comprising instructions to:
identify the number of available events at the event port if the specified number of events is zero; and
inform the requesting computer software application of how many events are available at the event port.

36. The computer program product of claim 20, wherein the events are asynchronous events.

37. The computer program product of claim 20, wherein the events are transaction events.

38. The computer program product of claim 20, wherein the event sources include one or more of: input devices, output devices, timers, signals, file updates, applications, system libraries, and drivers.

39. A computer system for retrieving transaction events generated by one or more event sources in a computer system, comprising: a processor;
an event queue configured to receive transaction events generated by one or more event sources, the event queue being accessible through an event port;
a request queue configured to hold requests to retrieve transaction events from the event queue, each request having an associated priority determining a place of the request in the request queue, wherein the specified number of events to be retrieved from the event port is used to determine a relative priority of the request in the request queue with respect to other requests in the request queue; and
a queue manager when executed by the processor, operable to:
receive requests from a computer software application;
organize the received requests in the request queue;
determine whether a sufficient number of events are available in the event queue to fill a request with a highest priority in the request queue;
if a sufficient number of events is available in the event queue, retrieve the events needed to fill the request with the highest priority in the request queue through the event port and return the filled request to the requesting computer software application; and change the associated priorities of the requests in the request queue based on the number of events available in the event queue, wherein the changing is further based on a specified number of events to be retrieved as part of at least one request received in response to a value set to the number of events available in the event queue.

40. The computer system of claim 39, wherein the request queue includes one or more stacks, each stack containing two or more requests with a same priority, the stacks being ordered in the request queue based on the priority of the requests in the respective stacks.

41. The computer system of claim 39, wherein a request in the request queue has an associated timeout prior to which the request must be satisfied.

\* \* \* \* \*

UNITED STATES PATENT AND TRADEMARK OFFICE
CERTIFICATE OF CORRECTION

PATENT NO.       : 7,624,396 B1                                    Page 1 of 1
APPLICATION NO.  : 10/789523
DATED            : November 24, 2009
INVENTOR(S)      : Miguel Isenberg It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1200 days.

Signed and Sealed this

Twenty-sixth Day of October, 2010

David J. Kappos
*Director of the United States Patent and Trademark Office*